United States Patent [19]
Tatham

[11] Patent Number: 5,849,236
[45] Date of Patent: Dec. 15, 1998

[54] METHOD AND APPARATUS FOR PLASTIC INJECTION MOLDING FLOW CONTROL

[75] Inventor: Glenn L. Tatham, Jefferson County, Mo.

[73] Assignee: Siegel-Robert, Inc.

[21] Appl. No.: 644,380

[22] Filed: May 10, 1996

[51] Int. Cl.$^6$ .................................................. B29C 45/23
[52] U.S. Cl. ...................... 264/297.2; 425/562; 425/563; 425/572; 425/588
[58] Field of Search .................................... 425/562, 563, 425/572, 588; 264/297.2

[56] References Cited

U.S. PATENT DOCUMENTS

| | | |
|---|---|---|
| 4,120,921 | 10/1978 | Webster . |
| 4,120,922 | 10/1978 | Lemelson . |
| 4,497,621 | 2/1985 | Kudert et al. . |
| 4,662,837 | 5/1987 | Anderson ................................. 425/556 |
| 4,781,554 | 11/1988 | Hendry . |
| 4,909,725 | 3/1990 | Ward ....................................... 425/562 |
| 4,946,365 | 8/1990 | Kudert et al. . |
| 4,966,545 | 10/1990 | Brown et al. ........................... 425/562 |
| 4,981,638 | 1/1991 | Schad et al. ............................ 425/588 |
| 5,028,377 | 7/1991 | Hendry . |
| 5,040,963 | 8/1991 | Beck et al. . |
| 5,069,858 | 12/1991 | Hendry . |
| 5,078,589 | 1/1992 | Osuna-Diaz ........................ 264/297.2 |
| 5,098,637 | 3/1992 | Hendry . |
| 5,204,051 | 4/1993 | Jaroschek . |
| 5,208,053 | 5/1993 | Vandenberg ........................... 425/572 |
| 5,254,306 | 10/1993 | Inada et al. . |
| 5,256,047 | 10/1993 | Moldovanyi . |
| 5,304,341 | 4/1994 | Shah . |
| 5,511,968 | 4/1996 | Guzzini et al. ........................ 425/566 |

FOREIGN PATENT DOCUMENTS 346361  6/1960  Switzerland ........................... 425/562

*Primary Examiner*—Tim Heitbrink
*Attorney, Agent, or Firm*—Polster, Lieder, Woodruff and Lucchesi, P.C.

[57] ABSTRACT

An apparatus and method for injection molding of thermoplastics has elements and steps comprising mating mold components having multiple mold cavities with flow passages and a plurality of conduits connected to the mold cavities so that thermoplastic can flow into the cavities. A plurality of flow control members are mounted relative to the mold and to corresponding conduits to be moved to regulate the flow of plastic through corresponding conduits into corresponding cavities to allow for controlling the rate of thermoplastic flow among the cavities. The flow control member can each have a first member movable into its corresponding conduit, and a second adjusting member movable to engage and move the first member. A biasing member can be provided to bias the first member relative to its corresponding conduit. The control members can be inserted to varying degrees within their corresponding conduits to control thermoplastic flow rate among the mold cavities. The flow control member can be controlled by structure external to the mold to allow adjustment of the flow control member. A modification provides for bores extending through outer end surfaces of mold components at an angle of about 45° to about 60° relative to their corresponding mold outer surface. In the modification, a control member can have a threaded section that mates with mold bore threads. The control member can have a non-threaded section distal thereto, a part of which is received within the non-threaded part of the bore for guidance during movement.

21 Claims, 3 Drawing Sheets

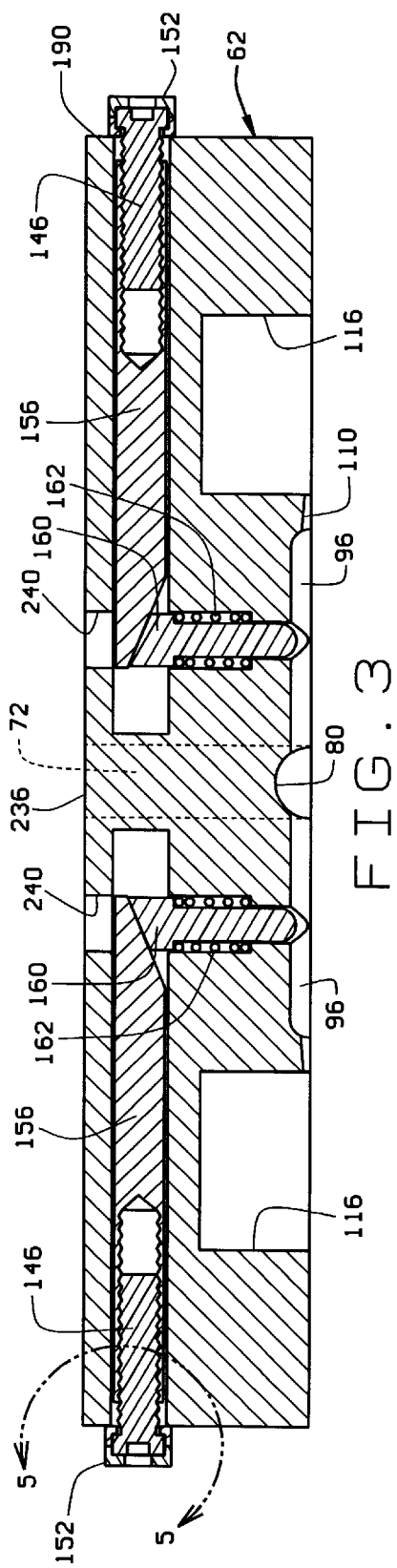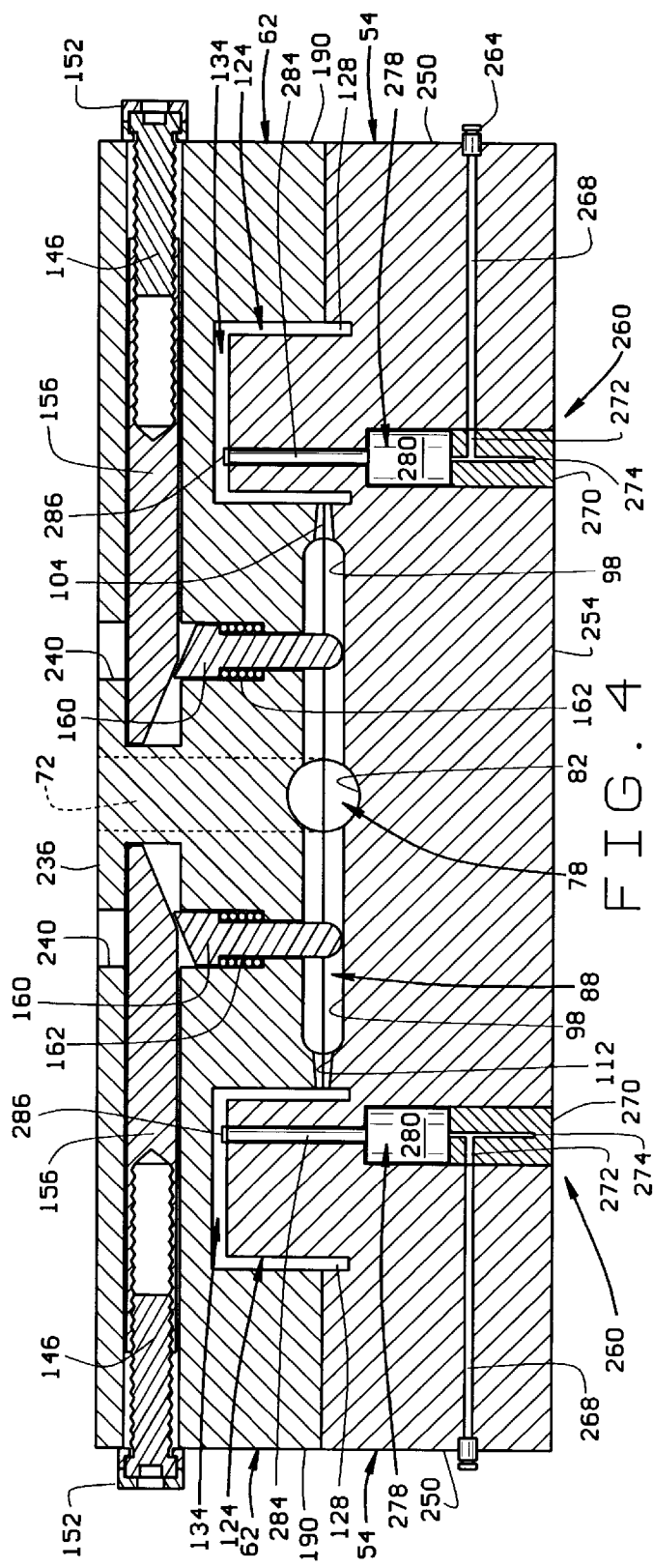

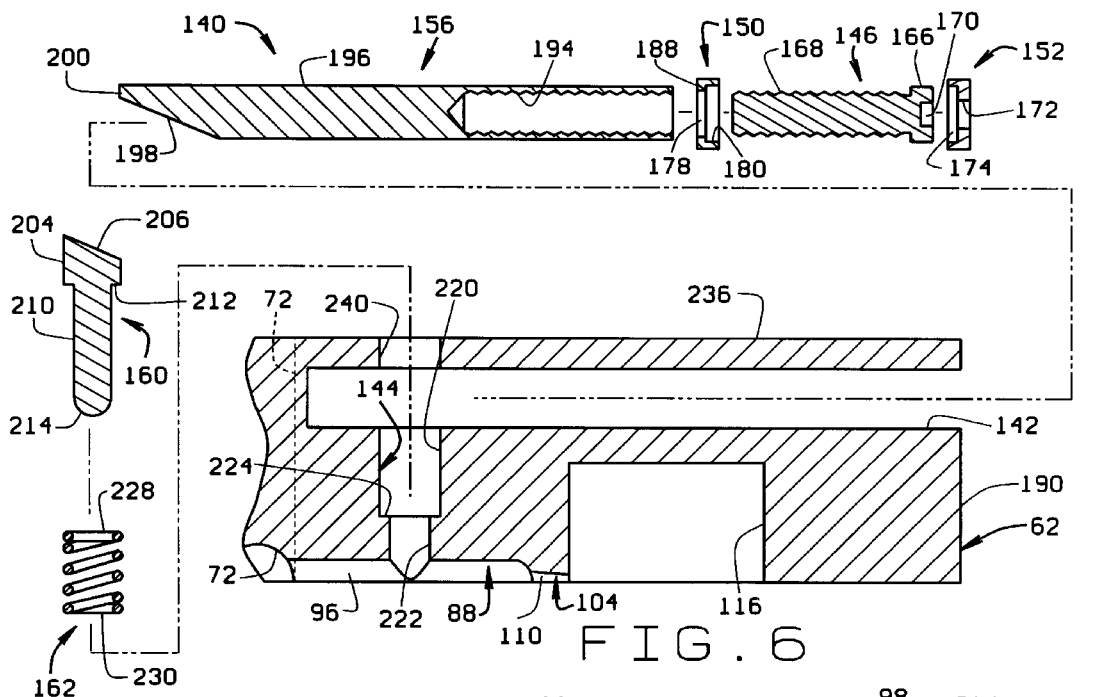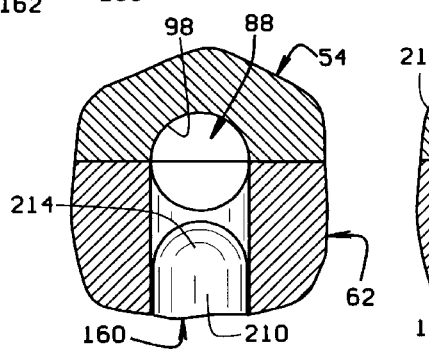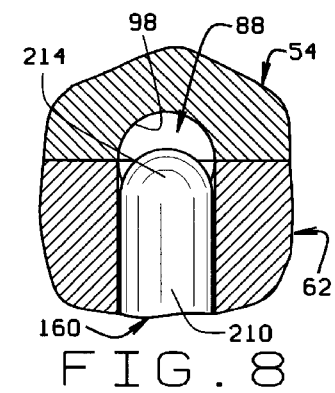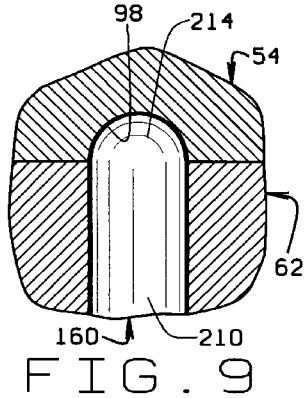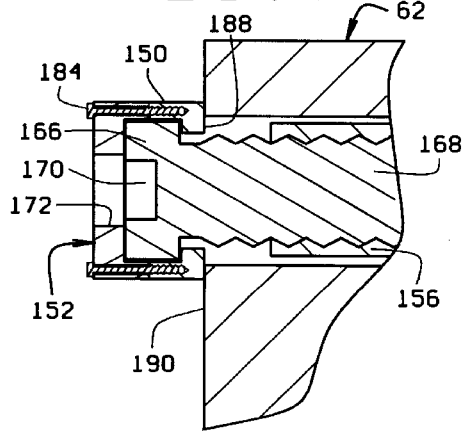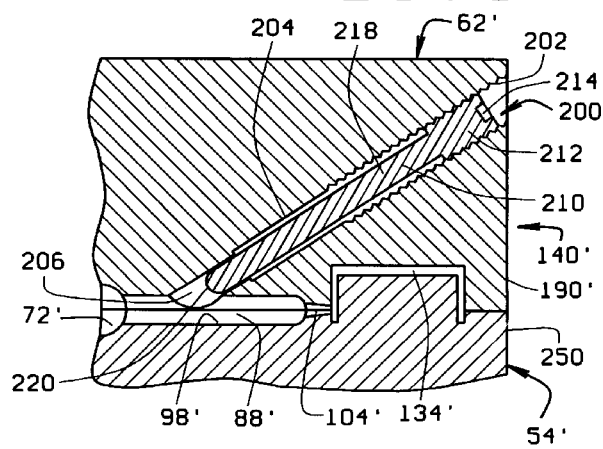

METHOD AND APPARATUS FOR PLASTIC INJECTION MOLDING FLOW CONTROL

FIELD OF THE INVENTION

This invention relates to injection of thermoplastic into multiple mold cavities, and the control of flow of the thermoplastic into the cavities during the molding process. This invention relates to both gas-assisted and non-gas assisted injection molding into multiple cavities. Such injection molding includes co-injection molding, which is the injection of two materials one inside the other. Gas-assisted injection molding into multiple cavities generally comprises two steps. First, viscous thermoplastic is injected through runner conduits and gate conduits into mold cavities. Shortly thereafter gas is injected through the runners and gates to force the thermoplastic against the walls of the mold cavities to form the desired articles. In the case of nongas-assisted injection molding, there is no gas injection step.

Injection molding can employ multiple mold cavities, for example, four mold cavities. The thermoplastic is injected through runner conduits, each of which leads to smaller gate conduits that are connected for flow into each of the cavities. With such multiple cavity molds, it is important to have consistency in the thermoplastic flow rate through the runners and gates into the cavities. Such precision in consistent flow rates is needed because if more thermoplastic enters one cavity than enters the other cavities, there is no place for the excess plastic in that first cavity to escape. Likewise, if two cavities receive more thermoplastic than the others, there is no place for the excess plastic to escape. As a result, in the case of gas-assisted injection, the molded article in the cavity or cavities with excess plastic will be irregular and not in conformity with the articles molded in the other mold cavities. An alternative problem is that if some cavities receive less than the required amount of thermoplastic, the injected gas will blow through the article causing it to collapse, or the articles molded in those cavities will otherwise lack the structure necessary for their effective function. In the case of nongas-assisted injection, excessive thermoplastic forced in a cavity results in "flashing", i.e., plastic escaping outside the cavity between the two mold halves. This escaped plastic solidifies into a sheet which must later be scraped off or otherwise removed.

In the prior art, when inconsistent flow rates occur with multiple cavity injection molding systems, corrective action is taken by grinding out or otherwise enlarging the conduit gate through which the flow is slow. However, this procedure has disadvantages because it is time-consuming and requires grinding tools, drills, or other tools to enlarge the gates. This gate enlarging technique additionally involves disassembly of the mold apparatus.

An even further problem is that the adjustment of the size of the gate flow path to one cavity will change the flow rate through the gates and runners leading to the other cavities, since all the runners are fed from one feeder, or trunk runner. Hence, adjustments of gate size are conducted on a trial and error basis, requiring testing after enlargement to determine if the flow rates are balanced. Further testing is necessary if the enlargement proves insufficient. Moreover, a conduit gate can be over-enlarged, necessitating enlargement of the gates for other cavities in order to compensate for such over-enlargement. This compound interrelationship of flow rates to multiple cavities makes the procedure for enlarging gates imprecise and tedious.

Moreover, the diameter of the gate conduit is typically small, and the grinding or boring procedure to enlarge it can shear or break parts of the cavity plate about the gate. This leads to an imprecise adjustment of the flow rate through the modified gate, or a need to replace the entire mold plate.

Additionally, the runners for such molds are typically formed by mating a mold cavity plate having recessed chambers, with a second mold plate that has corresponding male projections. Conduit halves for the runners and gates are formed in both mold plates. The engagement of the two plates forms the shape of the runners and gates, as well as the cavities that receive thermoplastic. Because of the surrounding structure for the mold apparatus, these gates and runners are located in positions not easily accessible for controlling flow.

SUMMARY OF THE INVENTION

The present invention solves problems in the prior art. The invention comprises an apparatus and method for effectively and efficiently controlling flow of thermoplastic into the cavities of a multiple cavity molds. The flow control means in one embodiment can comprise a mold plate having means for movably mounting a multiple pin assembly. The multiple pin assembly permits control of flow through the conduit runners of the mold in what are otherwise difficult points to access during the molding process. The pins can be mounted so that a front proximately located pin can be engaged and moved to thereby move a second distal pin into and out of a runner.

In one embodiment of the invention, each multiple pin assembly has a first flow adjustment pin and a second flow regulation pin. Both pins are movably mounted relative to a mold plate. The flow adjustment pin is in a proximate position relative to the exterior of a mold plate, such as the cavity plate. The second flow regulation pin is in a distal relationship to the exterior of the mold plate, so that its distal end can be moved a desired amount into a runner conduit leading to one of the mold cavities. An embodiment can comprise a mold plate having a first bore that movingly receives the adjustment pin, and a second bore intersecting the first bore and which movingly receives the regulation pin. The adjustment pin can engage the regulation pin to move the regulation pin within the corresponding runner. Means for biasing can bias the regulation pin away from its corresponding runner.

More specifically, in one embodiment the two pins can have complementary surfaces that engage each other so that longitudinal movement of the proximate adjustment pin to and fro provides a wedge drive that moves the distal regulation pin in and out of the runner conduit to varying degrees. The regulation pin can be inserted to totally block flow of injected thermoplastic through the runner, or withdrawn to a fully retracted position so as not to enter the runner, and also be placed in intermediate positions as desired to control the flow rate of thermoplastic through the runner. The end of the regulation pin can be shaped to conform to the shape of the runner wall for secure blocking engagement. The biasing means, such as a spring, can be mounted against ledges or structure within a mold plate and regulation pin. The regulation pin can be mounted in its bore to be approximately perpendicular to the runner conduit.

The movement of the adjustment pin can be controlled. As an example, a screw control member is mounted relative to the mold plate so that the screw shaft can freely rotate to drive the adjustment pin to and fro, but keeping the screw shaft from moving longitudinally relative to the mold plate. As a further example, retainer plates fit about the screwhead to allow the screwhead to freewheel therein while preventing longitudinal movement of the screwhead. The retainer plates are shaped to allow a driving tool to access the screwhead to rotate the screw shaft.

In an alternate embodiment, the apparatus can comprise a bore extending through a mold plate from the plate's exterior surface to intersect a runner. A flow control pin can be housed within the bore, with means provided to controllingly move the pin to and fro within the bore to set the pin and the flow rate through the runner at a desired amount. As a more specific example, movable mounting can be provided by the bore having a threaded section for association with a threaded pin section so that pin rotation in opposite directions moves the pin to and fro. In this embodiment the screwhead can be housed within the bore at the various screw settings.

The present invention thus eliminates the need to grind or otherwise permanently enlarge or alter the size of a gate conduit or runner conduit within the mold. There is further no need to disassemble the mold in order to make any adjustments in injection flow rate, since the invention can be operated with the mold components mounted in their usual and customary positions. Because of the invention's ease of adjustment, the variance and range of adjustment, and the ability to easily readjust and fine tune the precision of the adjustment, there is no problem with an irreversible adjustment and irreversible impact on the flow rates of other runners and gates feeding other cavities. With the present invention, if a runner flow adjustment is made but found to be unsatisfactory, a readjustment can easily be made without having to adjust injection flow through runners to other cavities unless so desired. Adjustments for flow rates of multiple runners can also be made if desired.

The structure of the invention is of sturdy and stable construction. The invention is further easy and economical to assemble, and safe to use.

DESCRIPTION OF THE DRAWINGS

FIG. 3 is a section taken on the line 3—3 of FIG. 2, showing the first mold half, with flow regulation pins in a retracted position;

FIG. 4 is a section also taken along the line 3—3 of FIG. 2, but with the second mold half also shown engaged with the first mold half, and flow regulation pins shown in an inserted position;

FIG. 5 is an enlarged view of part of FIG. 3 taken in the area of the line 5—5;

FIG. 6 is an exploded view of part of the second mold half and a flow control pin assembly;

FIG. 7 is an enlarged view showing a flow regulation pin in a retracted position;

FIG. 8 is an enlarged view showing a flow regulation pin partially inserted within a branch runner conduit;

FIG. 9 is an enlarged view showing the flow regulation pin completely inserted within a branch control conduit; and FIG. 10 is a section view of a modification of the flow control assembly of the apparatus.

DESCRIPTION OF PREFERRED EMBODIMENTS

Basic Mold Apparatus Structure

Figure 1:
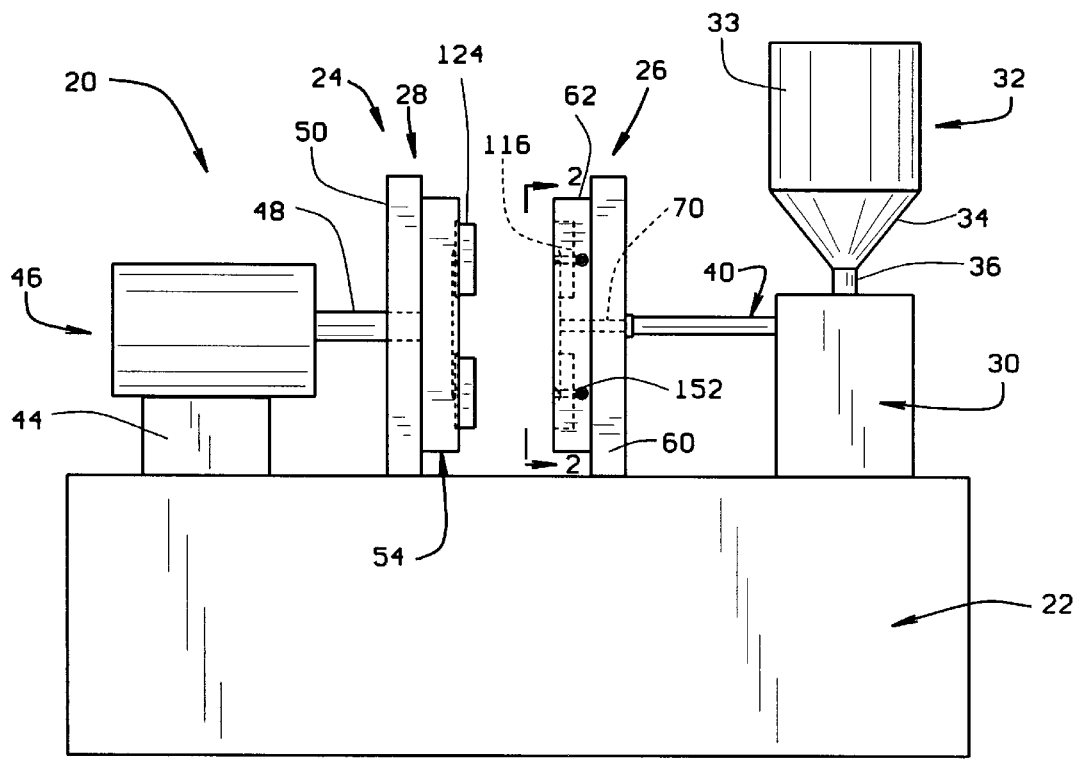
FIG. 1 is a front elevation of the apparatus, showing the mold body with its mold halves in a non-engaged position.

The apparatus for injection molding thermoplastics is generally shown as 20 in the drawings. It generally comprises a base 22 which supports a mold body 24. Mold body 24 comprises a first mold half component 26 generally mounted in fixed position relative to the base 22. Mold body 24 also comprises a second mold half component 28 that is movably mounted relative to the base in order to mate or engage with the first mold half 26.

Apparatus 20 further comprises a support 30 mounted upon the base. Mounted on support 30 is a hopper 32 that holds pelletized thermoplastic. Hopper 32 has a cylindrical section 33 and a funnel section 34 that feeds into a pipe 36. Pipe 36 extends within support 30 to be connected to barrel pipe 40. Barrel 40, in turn, is in flow connection with the second mold half 28, as will be further described. Heating means such as heater bands (not shown) can extend about barrel 40 to heat and fluidize the pellitized plastic fed into it. An auger or drive screw (not shown) extends through barrel 40. Pellitized thermoplastic is fed from the hopper 32, pipe 36 into barrel 40 where it is heated and fluidized so that fluid thermoplastic is fed into the second mold half 28.

Toward the other side of apparatus 20, a support 44 rests on base 22 to mount a hydraulic motor 46. Motor 46 linearly drives a shaft 48 connected to the movable mount plate 50 of second mold half 28. A vertically aligned male mold plate 54 is secured to mount plate 50, as by bolts (not shown). Second mold half 28 can be moved horizontally by motor 46 and shaft 48 into mating engagement with first mold half 26, and thence away from engagement with mold half 26.

The first mold half 26 comprises a vertically extending mount plate 60 to which a mold cavity plate 62 is attached as by bolts (not shown). Mount plate 60 is firmly secured to base 22 as by bolts or welding (not shown). Extending through mold half 26 is a horizontal sprue passage 68. Sprue 68 is comprised of a proximate sprue passage section 70 that extends through plate 60, which connects to a second distal sprue passage section 72 that extends through cavity plate 62.

Thermoplastic Flow Patterns, And Mold Cavities

Now the discussion turns to the thermoplastic flow path from the feed barrel 40 to the mold body 24. This description will refer to the mold halves 26 and 28 as viewed when separated such as in FIG. 1, and when mated together as seen in FIG. 4. Runner conduits to be described are formed by half sections present in each of the mold halves 26 and 28. When the mold halves are mated as in FIG. 4, these conduit halves form whole conduits.

Figure 2:
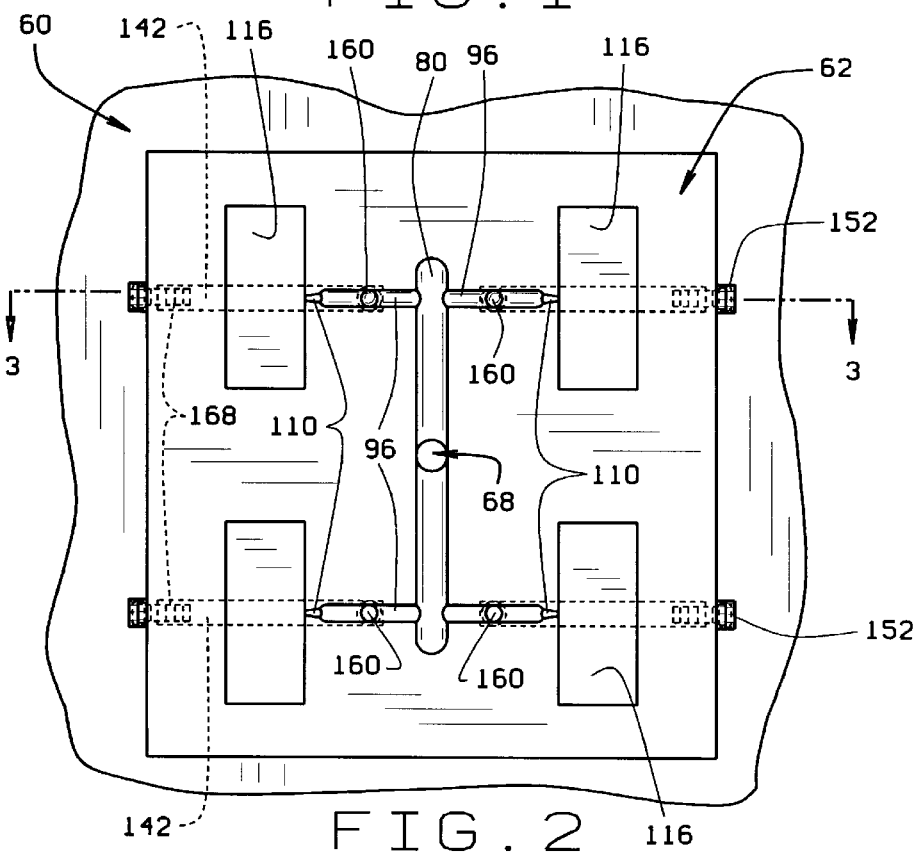
FIG. 2 is an elevation taken on the line 2—2 of FIG. 1.

When the mold halves 26 and 28 mate as in FIG. 4, the distal sprue section 72 extends into flow connection with a trunk runner conduit 78. Trunk runner 78 is formed of a half section 80 recessed in mold cavity plate 62, and a half section 82 recessed in male mold plate 54. Near its top, trunk runner 78 extends into two branch runner conduits 88, and near its bottom extends into another two branch runner conduits 88, half of which are shown in FIG. 2. Each branch runner conduit 88 is formed of a half conduit section 96 that is recessed in cavity plate 62 and a half conduit section 98 that is recessed in male mold plate 54.

Therefore, as gleaned from looking at FIG. 2, the upper branch runners conduits 88 formed from upper branch half conduit sections 96) are horizontally aligned with each other at a point above sprue 68, while the lower branch runner conduits 88 (formed from lower branch half conduit sections 96) are each horizontally aligned below sprue 68.

At the distal end of each branch runner 88 is a gate conduit 104. Gate conduits 104 are formed by gate conduit halves 110 recessed in cavity plates 62, and gate conduit halves 112 recessed in male mold plate 54.

Cavity plate 62 further comprises pairs of upper and lower chambers 116, which in this instance, as illustrated in FIGS. 2 and 3, have a generally rectangular shape. The male mold plate 54 has pairs of upper and lower projections 124, respectively, also of generally rectangular shape for purposes of this illustration. A rectangular shaped moat 128 recesses into mold plate 54 adjacent each projection 124.

As illustrated in FIG. 4, when the male plate 54 engages cavity plate 62, each of the moats 128 are aligned with its corresponding chambers 116 so that a cavity 134 is formed about projection 124. Cavity 134 can receive injected thermoplastic from its corresponding gate passage 104 with which it is directly connected.

Thus, when the male mold plate 54 engages mold cavity plate 62, fluid thermoplastic can flow through sprue 72 into trunk runner 78 and thence into branch runners 88 through their corresponding gates 104 to be injected into corresponding mold cavities 134.

Flow Control Assemblies

Now attention is directed to the flow control subassemblies 140 that provide means for controlling the thermoplastic flow into each of the aforesaid cavities 134. Four subassemblies 140 are illustrated, with a description of one sufficient to describe the others. Referring to the exploded view of FIG. 6, and also to FIGS. 3–5, each flow control assembly 140 generally comprises the cavity plate 62 and its outwardly opening bore 142 and intersecting transverse bore 144, as well as a screw 146, inner and outer screw retainer plates 150 and 152, an adjustment pin member 156, a flow regulation pin member 160 which interfaces with pin 156, and means for biasing pin 160 such as a helical spring 162.

More specifically, screw 146 can be an Allenhead screw having a head 166 and a threaded shaft 168. Head 166 has a recess 170 to drivingly receive a rotation tool (not shown). Outer retainer plate 152 has a central outer opening 172 sized to receive the screw rotation tool. Opening 172 extends into an open recess 174 sized to rotatably receive screw head 166. Inner retainer plate 150 has a distal opening 178 sized to allow passage of screw shaft 168, which connects to an outer recess 180 sized to rotatably receive screw head 166. Screws 184 pass through bores in outer plate 152 into threaded bores in inner plate 150 to hold the plates 152 and 154 together. Sufficient clearance exists between the screw head 166 and the surrounding plate recesses 174 and 180 to allow the screw head 166 to freely rotate therein. As can be seen in FIG. 5, the diameter of both retainer plates 150 and 152 is greater than the diameter of bore 142. Therefore the inner surface 188 of retainer plate 150 abuts the cavity plate outer end surface 190 about the opening of bore 142.

Adjustment pin 156 has a threaded bore 194 which drivingly receives the threaded screw shaft 168. The adjustment pin outer surface 196 is generally cylindrical, while its distal end is beveled with a slanted surface 198 and a flat tip 200.

The flow regulation pin 160 has an enlarged proximate section 204 having a proximate slanted surface 206. Surface 206 extends at an angle complementary to the angle of adjustment pin surface 198, so that the two angles collectively equal about 90°. Enlarged pin section 204 extends into a distal pin section 210 of less diameter, with an annular ledge 212 formed at the point of their intersection. Distal pin section 210 extends into a hemispherically shaped tip 214 which has approximately the same radius as the radius of the cylindrical branch conduits 88. Thus, when pin section 210 is fully inserted into branch runner 88 as seen in FIG. 9, its tip 214 fits flush against part of the semi-cylindrical branch runner section 98.

Cavity plate transverse bore 144 comprises a larger bore section 220 that extends into a smaller diameter counterbore 222. An annular ledge 224 is formed in cavity plate 62 at the intersection of counterbore 222 and bore 220. Helical spring 162 extends about flow regulation pin section 210. The spring proximate end 228 abuts the regulation pin ledge 230. The distal spring end 230 abuts the plate ledge 224. Spring 162 accordingly is mounted to bias the flow regulation pin 160 away from branch runner 88, with slanted pin surface 206 biased thereby against the slanted surface 198 of adjustment pin 156.

The back surface 236 of cavity plate 62 has a cylindrical bore 240 extending therethrough which intersects the bore 142. Bore 240 has a diameter slightly larger than the outer diameter of the larger proximate section 204 of flow regulation pin 160. Thus, for installation of the flow control subassemblies 140, the adjustment pin 156 is positioned to be either not inserted into bore 142, or at least positioned so as not to block bore 240. Spring 162 and flow regulation pin 160 can be inserted to pass through bore 240 to be positioned such as shown in the drawings. The male mold plate 54 has end surfaces 250 and a back surface 254.

In the case of gas-assisted injection molding, gas fitting assemblies 260 are associated with each cavity 134 so that gas can be injected into the cavity at the appropriate time. As known in the art, each gas injection assembly 260 comprises a gas fitting 264. A bore extends through cavity mold plate end surface 250 into male mold plate 254 and telescopically receives the inner end of fitting 264. Each fitting 264 is in flow connection with a tube 268 which extends transversely through a conforming bore in male mold plate 54. A cylindrical plug 270 is telescopically received with a cylindrical bore that extends through the back surface 254 of mold plate 54. Plug 270 has a transverse bore 272 that is aligned with the bore of tube 268 so that gas may flow from tube 268 through bore 272. Bore 272 intersects axially aligned bore 274 in plug 270. The inner end of plug 270 abuts the rear end of the body 278 of a gas needle 280. Gas needle 280 also comprises a gas needle pin 284. As is well known in the art, the gas needle body 278 has an internal passage which is in flow connection with a bore extending through the needle 284. The gas needle body 278 can have internal valve mechanism such as a spring loaded piston which permits flow of gas therethrough toward the end of the pin 284 where a cap 286 is mounted. Hence, at desired times gas can be injected through the fitting 264 and through pin 284 and around cap 286 into each cavity 134.

Operation

In operation, each of the four flow control assemblies 140 can be installed as described, and positioned so that each of their distal flow regulation pins 160 are in a retracted position such as indicated in FIG. 7. If it is determined that irregular flow is occurring such as, for example, that one cavity 134 is receiving injected thermoplastic at a greater flow rate than the other cavities, the assembly 140 associated with that particular cavity can be adjusted to rectify the problem. To do so, the rotation tool is inserted through the opening 172 of outer retainer plate 152 within screwhead recess 170 to rotate screw 146 to drive screw 156 so that its slanted drive surface 198 is moved toward corresponding slanted surface 206 of flow regulation pin 160. The force of adjustment pin surface 198 against regulation pin surface 206 is sufficient to overcome the countervailing bias force of spring 162. As a result, regulation pin 160 is moved so that its tip 214 enters its corresponding runner 88 to a desired amount such as illustrated in FIG. 8. During such rotation of screw 146 the screwhead 166 freewheels within the recesses 174 and 180 of retainer plates 152 and 150, respectively. As a result, the screwhead 166 remains in an easily accessible position during the adjustment operation. The screw drive allows for great control in the degree of advancement or retraction of the adjustment pin 156 and correspondingly to the insertion of regulation pin 160 into runner 88.

After insertion to the FIG. 8 position, a test molding run can be conducted to ascertain if the flow rates are sufficiently consistent among the four cavities 134. If, for example, the tip 214 of pin 160 has been moved too far into runner 88, the rotation tool can be quickly and easily inserted once again through retainer plate 152 to rotate screw 146 in the opposite direction so that the slanted adjustment pin surface 198 is moved away from the slanted regulation pin surface 206. When this occurs, the bias of spring 162 retracts pin 160 and pin tip 214 a distance corresponding to the amount of rotation of screw 146. Another test can be conducted to determine if sufficient uniformity and flow rate exists among the cavities 134. Depending on whether the tests show that the flow rate into the subject cavity is too great or too small, the screw 146 can be again operated to move regulation pin 160 to a desired position for retesting. This process can be repeated until satisfactory uniformity among flow rates to the cavities 134 is achieved.

Likewise, should flow rate imbalance be such that adjustment is needed with more than one of the assemblies 140, each of the assemblies 140 can be operated so that its corresponding tip 214 of regulation pin 160 is inserted to a position to allow uniformity of flow rate of thermoplastic through the runners 88, gates 104 into cavities 134.

The foregoing adjustment procedures can be conducted without grinding, drilling or otherwise making any permanent and unalterable enlargement of either of the runners 88, gates 104, or cavities 134. Such adjustment can be conducted in less than a minute. It is not necessary to dismount either of the mold halves 26 or 28 from the apparatus 20. Nor is it necessary to dismount or disconnect either the cavity plate 62 or male plate 54, from its corresponding mount plate 50 or 60, respectively.

Furthermore, at any point when the apparatus 20 is stopped to allow such adjustment, adjustments can be made for multiple assemblies 140 according to the estimated adjustments contemplated. Because of the multiple control assemblies 140, great flexibility and latitude in flow adjustment arrangements are permitted.

Alternate Embodiment

Focusing now on the alternate embodiment of the flow control assembly 140' shown in FIG. 10, the cavity plate 62' has an angled bore 200 comprised of a threaded proximate bore section 202 that extends into an intermediate unthreaded section 204 which thence extends into a bore section 206 of less diameter. Bore section 206 extends into connection with runner 88'. The angle of the bore 200 relative to the end surface 190' of cavity plate 62' is about 58°. The angle of bore 200 relative to end surface 190' is preferably in the range of about 45° to about 60°. Assembly 140' employs a single control pin 210. Pin 210 has a larger externally threaded proximate section 212. Section 212 has a recess 214 shaped as recess 170 in screw 146, to drivingly receive a rotation tool. Proximate screw section 212 extends into a distal pin section 218 which has a smooth external surface and a rounded hemispherical tip 220. Tip 220 has a radius corresponding to the radius of cylindrical runner 88' so that tip 220 when extended completely within runner 88' fits flush against the surface 98' of runner 88'.

Pin assembly 140' can be operated to control flow through runner 88'. A rotation tool can be inserted within recess 214 of proximate pin section 212 to rotate pin 210 to and fro, so that pin 210 if desired can be moved to extend tip 220 a desired distance into runner 88' to regulate thermoplastic flow therethrough. Multiple assemblies 140' can be provided corresponding to each runner 88' for each cavity 134'. After the setting of the pin 210 to a desired position, testing can be conducted to see if the relationship among the various pins 210 is satisfactory to allow uniformity of flow through the runners 88' into cavities 134'. If further adjustment is needed for any of the pins 210, the rotation tool can be again used to move the pin tip 220 further into runner 88' or away from runner 88'.

With this embodiment there is no retainer plate such as retainer plates 150 and 152 in the embodiment of FIGS. 1–6. When the pin tip 220 is fully retracted from runner 88', the enlarged proximate pin section 212 is still fully within the proximate bore section 202, as seen in FIG. 10.

With the foregoing adjustments of assemblies 140' there is likewise no need to make any permanent adjustment or enlargements of the sizes of runners 88', gates 104' or cavities 134'. Nor is there a need to disassemble or dismount mold plates 54' or 62'. This alternate embodiment likewise has advantages of being simple, easy and efficient to operate, and is of sturdy and strong construction.

Various other modifications apparent to those with ordinary skill in the art can be made to the aforementioned disclosure of preferred embodiments without departing from the spirit of the invention, which is limited only by the following claims.

What is claimed is:

1. A method for controlling the flow rate of thermoplastic into multiple cavities of a mold during injection molding of thermoplastics, comprising the steps of:

(a) providing a mold having a first mold component and a second mold component shaped to mate with the first molding component, with a plurality of mold cavities formed by the first and second mold components when the first and second mold components mate;

(b) providing a sprue flow passage for the mold for receiving fluid thermoplastic therethrough;

(c) providing the mold with a plurality of conduits, each conduit being in fluid flow connection with the sprue passage and with a corresponding cavity so that fluid thermoplastic can flow from the sprue passage through each conduit into its corresponding cavity;

(d) providing means to control the flow of thermoplastic through the plurality of conduits comprising a plurality of flow control members, each said flow control member being movably mounted relative to the mold and relative to its corresponding conduit to move to and fro in directions transverse to its corresponding conduit, each said flow control member being insertable into its corresponding conduit to a desired degree; and (e) moving the control member to be inserted into its corresponding conduit to said desired degree to control the flow rate of thermoplastic through the said corresponding conduit into its corresponding cavity for balancing flow of resin into each of said cavities.

2. A method for controlling the flow rate of thermoplastic into multiple cavities of a mold during injection molding of thermoplastics, comprising the steps of:

(a) providing a mold having a first mold component and a second mold component shaped to mate with the first molding component, with a plurality of mold cavities formed by the first and second mold components when the first and second mold components mate;

(b) providing a sprue flow passage for the mold for receiving fluid thermoplastic therethrough;

(c) providing the mold with a plurality of conduits, each conduit being in fluid flow connection wit the sprue passage and with a corresponding cavity so that fluid thermoplastic can flow from the sprue passage through each conduit into its corresponding cavity;

(d) providing means to control the flow of thermoplastic through the plurality of conduits comprising providing the mold with a plurality of pairs of a proximate bore and a distal bore, each of said distal bores being interconnected with a corresponding proximate bore, each distal bore extending into a corresponding conduit, an adjustment pin mounted for movement along each said proximate bore, a regulation pin mounted distal to a corresponding adjustment pin for movement along each distal bore so that each adjustment pin can movingly engage its corresponding regulation pin to move the regulation pin into the said corresponding conduit to control thermoplastic flow therethrough; and (e) moving each said adjustment member to cause movement of each corresponding regulator member to be inserted into its corresponding conduit to a desired degree to control the flow rate of thermoplastic through the said corresponding conduit into its corresponding cavity for balancing flow of thermoplastic into each of said cavities.

3. A method for controlling the flow rate of thermoplastic into multiple cavities of a mold during injection molding of thermoplastics, comprising the steps of:

(a) providing a mold having a first mold component and a second mold component shaped to mate with the first molding component, with a plurality of mold cavities formed by the first and second mold components when the first and second mold components mate;

(b) providing a sprue flow passage for the mold for receiving fluid thermoplastic therethrough;

(c) providing the mold with a plurality of conduits, each conduit being in fluid flow connection with the spree passage and with a corresponding cavity so that fluid thermoplastic can flow from the sprue passage through each conduit into its corresponding cavity;

(d) providing means for controlling the flow of thermoplastic through the plurality of conduits comprising providing the mold with a plurality of chambers and a plurality of corresponding flow control members for being received within a corresponding chamber, providing the said chambers with threaded section and a non-threaded section; and providing each said flow control member with a threaded section with threads that correspond with and mate with the said chamber thread; and providing the said flow control members with non-threaded sections distal to the said threaded sections of said flow control members, for insertion within its corresponding conduit at multiple locations within its corresponding conduit; and (e) moving the control member to be inserted into its corresponding conduit to a desired degree to control the flow rate of thermoplastic through the said corresponding conduit into its corresponding cavity for balancing flow of thermoplastic into each of said cavities.

4. An apparatus for injection molding of thermoplastics, comprising:

(a) a mold comprising a first mold component, and a second mold component shaped to mate with the first molding component,. with a plurality of mold cavities formed by the first and second mold components when the first and second mold components mate, so that articles can be molded in the cavities;

(b) means for mounting the first and second mold components so that the two mold components can be moved into a mating relationship and can be moved apart from each other away from a mating relationship to allow removal of molded articles from the cavities;

(c) the mold having a sprue flow passage for receiving fluid thermoplastic flow therethrough;

(d) the mold having a plurality of conduits, each such conduit being in fluid flow connection with the sprue passage and with a corresponding cavity so that fluid thermoplastic can flow from the sprue passage through each conduit into its corresponding cavity;

(e) means for controlling the flow rate of thermoplastic through each said conduit comprising a plurality of flow control members, each flow control member being movably mounted relative to the mold, and each flow control member being mounted relative to a corresponding conduit to move to and fro in directions transverse to its corresponding conduit so that the control member can be moved to be inserted at multiple locations within its corresponding conduit to regulate the flow of thermoplastic through the said corresponding conduit into its corresponding cavity so that the flow of thermoplastic through the corresponding conduit into its corresponding cavity can be selectively adjusted, to provide balanced flow of thermoplastic to each of said cavities.

5. The thermoplastic injection molding apparatus of claim 4, wherein each flow control member comprises a regulator member and the means for controlling flow further comprises a plurality of adjusting members, each being movably mounted relative to a corresponding regulator member to engage the regulator member to move the regulator member into its corresponding branch conduit.

6. The thermoplastic injection molding apparatus of claim 5, further comprising means for biasing each said regulator member away from insertion into its corresponding branch conduit.

7. The thermoplastic injection molding apparatus of claim 6 wherein each regulator member can be moved transversely relative to its corresponding branch conduit to be totally withdrawn from said corresponding branch conduit so that the control member does not impede flow through its corresponding branch conduit.

8. The thermoplastic injection molding apparatus of claim 7 wherein each regulator member can be positioned to shut off flow through its corresponding branch conduit.

9. The thermoplastic injection molding apparatus of claim 5 wherein at least one of the mold components has an outer surface, and wherein each of the adjusting members are contained within a chamber of said mold component with a surface, the said chambers each having an opening that extends through the outer surface of the said mold component, and further comprising a control member having means to be engaged and disengaged with the adjusting member so that when the control member is engaged to the adjusting member, the control member extends beyond the said chamber and beyond the outer surface of the said mold component, so that the control member can be moved to control the movement of the adjusting member to move the adjusting member toward the regulator member and away from the regulator member.

10. The thermoplastic injection molding apparatus of claim 9, further comprising means for retaining the control member so that the control member extends beyond the chamber opening.

11. The thermoplastic injection molding apparatus of claim 10 wherein the control member has a part thereof that extends beyond the said outer surface of the mold component when the control member is engaged with the adjusting member, which part is enlarged to be larger than the part of the control member immediately distal to the enlarged part, and wherein the retaining means comprises a retaining member mounted to fit about the said opening and being larger than said opening so that it cannot pass through said opening, and wherein the retaining member has means for receiving the enlarged part of the control member so that the enlarged part of the control member can rotate freely relative to the retaining member.

12. The thermoplastic injection molding apparatus of claim 11 wherein the aforesaid retaining member is a first retaining member, and wherein the means for retaining further comprises a second retaining member with means for engaging the first retaining member to be held in position relative to the second retaining member so that a cavity is formed between the first and second retaining members, said cavity being sized to receive the enlarged control member part so that said enlarged control member part can freely rotate within said cavity, said enlarged control member having means for being engaged by a rotation tool, the second retaining member having an opening sized to receive a rotation tool to allow said rotation tool to engage the enlarged control member part.

13. The thermoplastic injection molding apparatus of claim 4 wherein the conduits comprises a first trunk conduit section in fluid flow connection with the sprue passage, with said trunk conduit section extending in fluid flow connection with a plurality of branch runner conduits, with each branch runner conduit extending to connection with a corresponding gate conduit, and each of said gate conduits extending to fluid flow connection with a corresponding cavity, wherein each said flow control member is movably mounted to be inserted within a corresponding branch runner conduit to a desired degree to control the flow rate of thermoplastic therethrough.

14. The thermoplastic injection molding apparatus of claim 13 wherein the means for controlling the flow rate of the thermoplastic comprises the mold having a plurality of pairs of a proximate bore and a distal bore, each of said distal bores being interconnected with a corresponding proximate bore, each distal bore extending into a corresponding branch conduit, an adjustment pin mounted for movement along each said proximate bore, a regulation pin mounted distal to a corresponding adjustment pin for movement along each distal bore so that each adjustment pin can movingly engage its corresponding regulation pin to move the regulation pin into the said corresponding branch conduit to control thermoplastic flow therethrough.

15. The thermoplastic injection molding apparatus of claim 14 further comprising means for biasing corresponding to each said regulation pin for biasing each said regulation pin in a direction away from its corresponding branch conduit so that the biasing means urges part of its corresponding regulation pin into engagement with its corresponding adjustment pin.

16. The thermoplastic injection molding apparatus of claim 15 wherein each adjustment pin has a distal end and a slanted surface toward its distal end, and wherein each corresponding regulation pin has a proximate end and a slanted surface toward its proximate end and a slanted surface toward its proximate end which engages the slanted surface of the corresponding adjustment pin, so that the sliding movement of each said adjustment pin towards its corresponding regulation pin engages the slanted surface of the said adjustment pin with the slanted surface of the corresponding regulation pin to move the said regulation pin in a direction toward the said corresponding branch conduit, and wherein sliding movement of the slanted surface of the said adjustment pin away from the slanted surface of the corresponding regulation pin allows the biasing means to move the regulation pin in a direction away from the said branch conduit and maintains the engagement of the regulation pin slanted surface against the adjustment pin slanted surface.

17. The thermoplastic injection molding apparatus of claim 4, said flow control means being accessible externally of said mold to enable adjustment of said flow control member when said first and second mold components are in a mated relationship.

18. The thermoplastic injection molding apparatus of claim 4, wherein each control member can be moved transversely relative to its corresponding conduit to be totally withdrawn from its corresponding conduit so that the control member does not impede flow through its corresponding conduit.

19. The thermoplastic injection molding apparatus of claim 4, wherein each control member that regulates flow to achieve variable flow rates through its corresponding conduit, can also be positioned to shut off flow through its corresponding conduit.

20. An apparatus for injection molding of thermoplastics, comprising:

(a) a mold comprising a first mold component, and a second mold component shaped to mate with the first molding component, with a plurality of mold cavities formed by the first and second mold components when the first and second mold components mate, so that articles can be molded in the cavities;

(b) means for mounting the first and second mold components so that the two mold components can be moved into a mating relationship and can be moved apart from each other away from a mating relationship to allow removal of molded articles from the cavities;

(c) the mold having a sprue flow passage for receiving fluid thermoplastic flow therethrough;

(d) the mold having a plurality of conduits, each such conduit being in fluid flow connection with the sprue passage and with a corresponding cavity so that fluid thermoplastic can flow from the sprue passage through each conduit into its corresponding cavity;

(e) means for controlling flow of thermoplastic through a conduit, comprising a flow control member movably mounted relative to the mold and relative to a corresponding conduit so that the control member can be moved to be inserted at multiple locations within its corresponding conduit to regulate the flow of thermoplastic through the said corresponding conduit into its corresponding cavity;

(f) wherein the conduits comprise a first trunk conduit section in fluid flow connection with the sprue passage, with said trunk conduit section extending in fluid flow connection with a plurality of branch runner conduits, with each branch runner conduit extending to connection with a corresponding gate conduit, and each of said gate conduits extending to fluid flow connection with a corresponding cavity; and wherein the mold components have outer end surfaces, one of the mold components having a bore extending through one of the said outer end surfaces of said mold component at an angle of about 45° to about 60° relative to the said outer end surface, and wherein the flow control member is movably mounted within said bore to be inserted at multiple locations within a corresponding branch runner conduit to impede or block thermoplastic flow therethrough; and (g) wherein the said mold component bore has a threaded section and a non-threaded section distal to said threaded section, said non-threaded section having a surface; and wherein the flow control member has a threaded section with threads that correspond with and mate with the said bore threads, and wherein the flow control member has a non-threaded section distal to the threaded section of said flow control member, with at least part of said non-threaded section being telescopically and slidingly received within the surface of the non-threaded section of the said bore so that the surface of the non-threaded section of the bore is in contact with the non-threaded surface of the flow control member to guide it during movement therein.

21. An apparatus for injection molding of thermoplastics, comprising:

(a) a mold comprising a first component, and a second mold component shaped to mate with the first molding component, with a plurality of mold cavities formed by the first and second mold components when the first and second mold components mate, so that articles can be molded in the cavities;

(b) means for mounting the first and second mold components so that the two mold components can be moved into a mating relationship and can be moved apart from each other away from a mating relationship to allow removal of molded articles from the cavities;

(c) the mold having sprue flow passage for receiving fluid thermoplastic flow therethrough;

(d) the mold having plurality of conduits, each such conduit being in fluid flow connection with the sprue passage and with a corresponding cavity so that fluid thermoplastic can flow from the sprue passage through each conduit into its corresponding cavity;

(e) means for controlling the flow rate of thermoplastic through each said conduit, comprising a plurality of flow control members, each flow control member being received within a corresponding chamber of one of the mold components, said chamber having a threaded section and a non-threaded section; and wherein the corresponding flow control member has a threaded section with threads that correspond wit and mate with the said chamber threads; and wherein the flow control member has a non-threaded section distal to the said threaded section of said flow control member, for insertion within its corresponding conduit at multiple locations within its corresponding conduit to regulate the flow of thermoplastic through the said corresponding conduit into its corresponding cavity so that the flow of thermoplastic through the corresponding conduit into its corresponding cavity can be selectively adjusted, to provide balanced flow of thermoplastic to each of said cavities.

* * * * *